United States Patent [19]

Miyatake et al.

[11] Patent Number: 4,587,766
[45] Date of Patent: May 13, 1986

[54] SYNCHRONOUS OPERATION CONTROL APPARATUS IN GRINDING MACHINES

[75] Inventors: Satoshi Miyatake, Kawagoe; Mitsuo Abe, Kiyose; Masao Kume, Tokyo, all of Japan

[73] Assignee: Honda Giken Kogyo Kabushiki Kaisha, Tokyo, Japan

[21] Appl. No.: 638,688

[22] Filed: Aug. 8, 1984

[30] Foreign Application Priority Data

Aug. 9, 1983 [JP] Japan .............................. 58-146025

[51] Int. Cl.$^4$ ............................................. B24B 19/00
[52] U.S. Cl. ............................ 51/95 GH; 51/165.71; 318/685; 409/12
[58] Field of Search ............ 51/95 R, 95 GH, 165.71, 51/165.72, 165 TP, 52; 409/12, 15; 364/474; 318/685

[56] References Cited

U.S. PATENT DOCUMENTS

| | | | |
|---|---|---|---|
| 3,152,422 | 10/1964 | Loxham | 51/95 GH |
| 3,204,532 | 9/1965 | Budnick | 409/15 |
| 4,178,537 | 12/1979 | Angst | 409/12 |
| 4,253,050 | 2/1981 | Angst | 51/95 GH |

*Primary Examiner*—Harold D. Whitehead
*Attorney, Agent, or Firm*—Banner, Birch, McKie & Beckett

[57] ABSTRACT

A synchronous operation control apparatus for rotating a grinding wheel and a gear to be ground thereby in synchronism to grind teeth of the gear to a nicety. A pulse generator is connected to a rotational drive source for rotating the grinding wheel, and a counter is connected to an output terminal of the pulse generator. A division error is calculated from the number of teeth of the grinding wheel and the number of teeth of the gear which have been supplied in advance, to produce data for correcting the division error. A rotational drive source for rotating the gear is energized by frequency-divided pulses issued from the counter with a count as corrected by the data.

4 Claims, 4 Drawing Figures

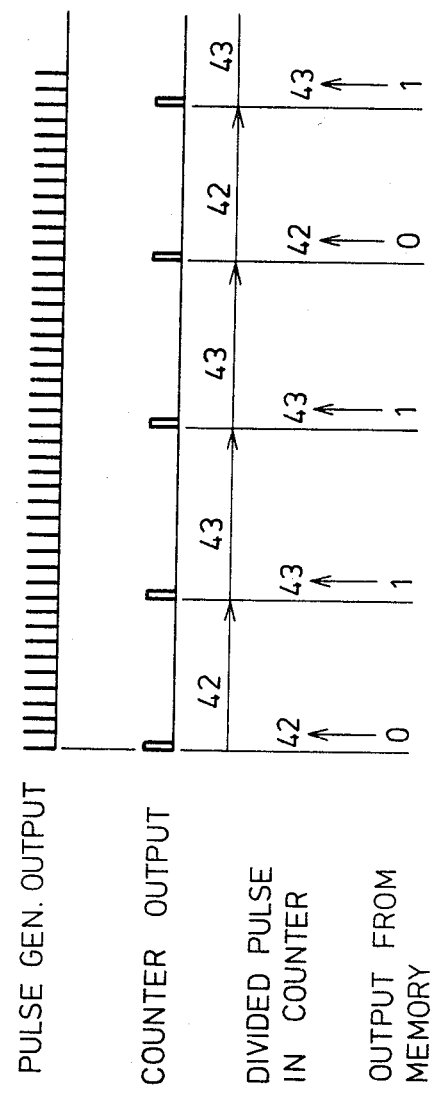

SYNCHRONOUS OPERATION CONTROL APPARATUS IN GRINDING MACHINES

BACKGROUND OF THE INVENTION

The present invention relates to a synchronous operation control apparatus for rotating a tool and a workpiece in synchronism with each other, and more particularly to a synchronous operation control apparatus for rotating a rotary tool and a workpiece in sychronism with each other by frequency-dividing a pulse train dependent on the number of r.p.m. of the rotary tool based on a predetermined division table, and driving stepping motor for rotating the workpiece based on a frequency-divided output.

There has been employed in the art an apparatus for grinding a number of teeth of a workpiece such as a gear while in mesh with a grinding wheel having helical teeth on an outer peripheral surface thereof. No desired finished gear can be achieved unless the grinding wheel and the gear are rotated in synchronism since the gear teeth would not be ground uniformly by the grinding wheel in the absence of synchronous rotation of the grinding wheel and the gear. To rotate the grinding wheel and the gear in synchronism, the following relation has to be met:

The number of r.p.m. of the grinding wheel × the number of teeth of the grinding wheel = the number of r.p.m. of the gear × the number of teeth of the gear.

For synchronous operation of the grinding wheel and the gear, it has been conventional practice to incorporate a plurality of speed change gears in a gear drive train and selectively use the gears to rotate the grinding wheel and the gear in synchronism.

With the prior apparatus, however, a number of precision speed change gears are required to thereby render the apparatus large in overall size and expensive. Since the gear changing operation is time-consuming, the downtime of the apparatus is increased or the availability thereof is reduced. Another problem is that since many gears are interposed between the workpiece drive motor and the gear being ground, the accuracy of rotation is lowered due to rotational errors which the individual gears have. It would be possible to employ a numerical control approach in which grinding wheel rotation data and gear rotation data are stored in a memory and the grinding wheel and the gear are rotated on the basis of the stored data. This numerical control arrangement would however be disadvantageous in that the overall apparatus is costly as a motor for rotating the grinding wheel has to be highly accurate.

To cope with the foregoing difficulties, the applicant filed a Japanese Patent Application entitled "Synchronous operation control apparatus in gear grinding machines" on Oct. 3, 1981, the application being laid open on Apr. 8, 1983. According to the earlier application, the apparatus includes a selective pulse output device composed of a central processing unit (CPU), a memory, and a shift register. Selective drive information for driving a workpiece spindle motor is read out of the memory by output pulses generated by a pulse generator coupled coaxially to a grinding wheel spindle motor with a grinding wheel mounted thereon, and the workpiece spindle motor supporting a gear to be ground in mesh with the grinding wheel is energized by the drive information read out of the memory.

SUMMARY OF THE INVENTION

The present invention has been made to improve the prior synchronous operation control apparatus for increasing a synchronous operation accuracy through an inexpensive arrangement.

It is an object of the present invention to provide a synchronous operation control apparatus in which a pulse generator is coupled directly to a grinding wheel rotated by a grinding wheel motor for generating pulses which are frequency-divided into pulses commensurate with a gear ratio between the grinding wheel and a workpiece gear to be ground and applied to a workpiece motor to rotate the gear in mesh with the grinding wheel, a division error per one revolution of the pulse generator coupled to the grinding wheel is held to a minimum by a gear accuracy of the gear and a division accuracy of the workpiece motor, and when frequency-dividing the pulse train from the pulse generator, the pulse train is corrected by preset data into a pulse signal which will be applied to the workpiece motor for thereby achieving accurate synchronous operation relatively easily between the grinding wheel motor and the workpiece motor.

According to the present invention, there is provided a synchronous operation control apparatus for operating a tool and a workpiece in synchronism, comprising a pulse generator for generating pulses dependent on the speed of rotation of the tool, a workpiece motor operatively coupled to a rotating shaft of the workpiece for rotating the workpiece, a frequency divider connected to the pulse generator, and a memory connected to the frequency divider and storing data to correct an error produced when the frequency divider frequency-divides the pulses generated by the pulse generator, the arrangement being such that the pulses from the pulse generator are frequency-divided on the basis of the stored data to produce a prescribed number of pulses to energize the workpiece motor.

The frequency counter comprises a subtractive counter.

The synchronous operation control apparatus also includes an adder connected to an output terminal of the memory for determining a frequency division frequency of the frequency divider from an output data signal from the memory for correcting the error and for issuing the frequency division frequency as a setting signal to the frequency divider.

The tool comprises a grinding wheel, and the workpiece comprises a gear to be ground by the grinding wheel in mesh therewith.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a timing chart showing the correlation between pulses generated by a pulse generator and pulses for driving a stepping motor.

DESCRIPTION OF THE PREFERRED EMBODIMENT

Figure 1:
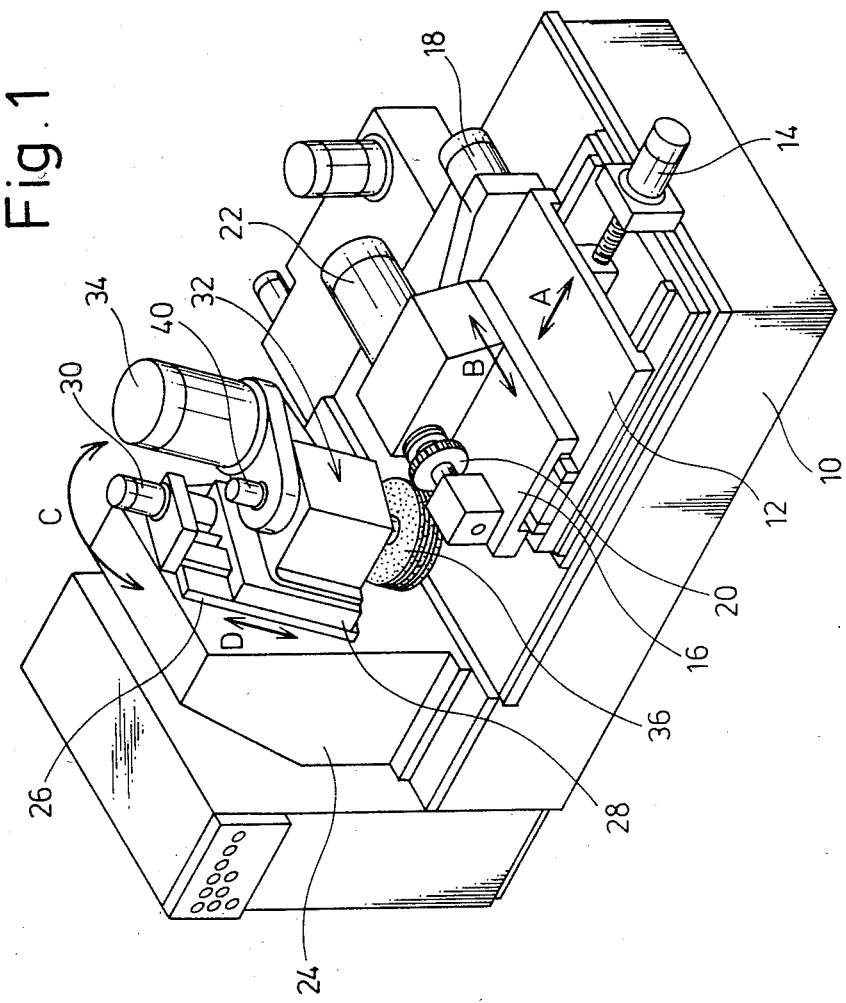
FIG. 1 is an isometric view of a gear grinding machine incorporating therein a synchronous operation control apparatus according to the present invention.

FIG. 1 shows a gear grinding machine in which a synchronous operation control apparatus according to the present invention is incorporated. The gear grinding machine includes a bed 10 supporting thereon a feed table 12 movable back and forth in the directions of the arrow A by means of a feed motor 14. A traverse table 16 is mounted on the feed table 12 and movable back and forth in the directions of the arrow B perpendicular to the directions of the arrow A by means of a traverse motor 18. A workpiece or gear 20 is detachably mounted on the traverse table 16, the workpiece 20 being rotatable by means of a workpiece spindle motor 22.

Figure 2:
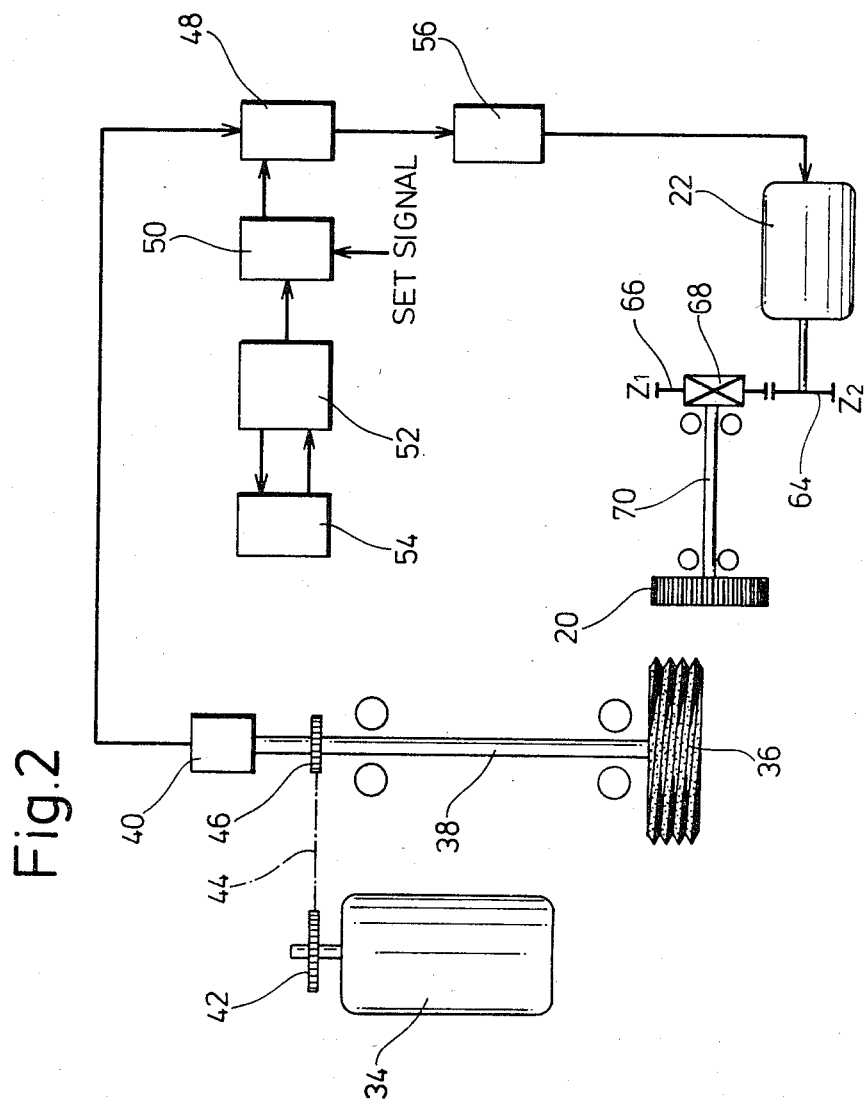
FIG. 2 is a block diagram of a circuit of the synchronous operation control apparatus of the invention.

A column 24 is disposed on the bed 10 in a position aligned with the directions in which the feed table 12 is movable. The column 24 supports a turntable 26 mounted on a side wall surface thereof and turnable in the directions of the arrow C by a motor (not shown) housed in the column 24. A shift table 28 is slidably mounted on the turntable 26. The shift table 28 is movable in the directions of the arrow D by a grinding wheel shifting motor 30, the shift table 28 supporting a grinding wheel spindle unit 32 thereon. The grinding wheel spindle unit 32 is composed of a grinding wheel spindle motor 34 and a circular grinding wheel 36 having several grooves defined in an outer peripheral surface thereof. As illustrated in FIG. 2, the grinding wheel 36 is supported by a rotatable shaft 38 connected directly to a pulse generator 40. Therefore, when the grinding wheel spindle motor 34 is energized, the grinding wheel 36 is rotated, and the pulse generator 40 produces a number of pulses.

A circuit for operating the synchronous operation control apparatus is illustrated in FIG. 2.

Figure 3:
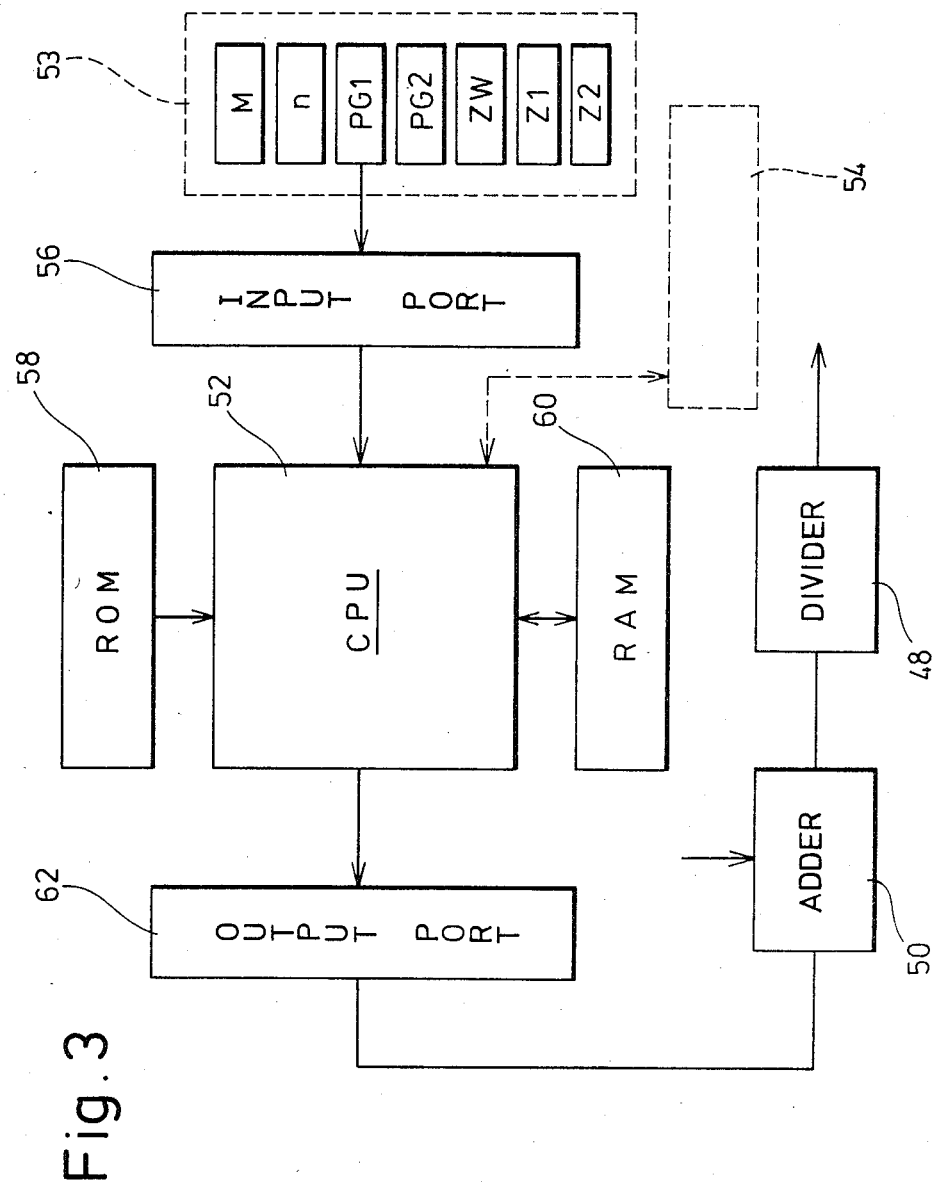
FIG. 3 is a block digram showing the relationship between a central processing unit and a frequency divider in the circuit illustrated in FIG. 2.

The grinding wheel spindle motor 34 has a rotatable shaft having a pulley 42 of a relatively large diameter mounted thereon and operatively coupled by a belt 44 to a smaller-diameter pulley 46 mounted on the rotatable shaft 38. The pulse generator 40 has an output terminal connected to an input terminal of a counter or frequency divider 48 having an output terminal connected to an amplifier 56. An adder 50 has an output terminal connected to another input terminal of the counter 48 and an input terminal to a central processing unit (hereinafter referred to as a "CPU") 52. The CPU 52 and the adder 50 are shown in FIG. 3. The CPU 52 is connected to an input unit 53 including a ten-key switch for inputting various pieces of information such as the type and the number of teeth of the grinding wheel 36, the type and the number of teeth of the gear 20, and the number of teeth of a gear (described later on), for example, an input port 56 for entering the various pieces of information from the input unit 53 into the CPU 52, a read-only memory (ROM) 58, a random-access memory (RAM) 60, an output port 62 for issuing a processed output to the adder 50, and an external memory 54.

The workpiece spindle motor or stepping motor 22 is connected to an output terminal of the amplifier 56. The stepping motor 22 has a rotatable shaft supporting thereon a gear 64 having a number of teeth Z2 held in mesh with a gear 66 having a number of teeth Z1. The gear 66 is operatively coupled through a clutch 68 to a shaft 70 for rotating the workpiece gear 20. The gear 20 is detachably mounted by a jig (not shown) on a distal end of the shaft 70.

Operation of the foregoing arrangement will be described. When the grinding wheel spindle motor 34 is energized, the larger-diameter pulley 42 is rotated to cause the smaller-diameter pulley 46 to rotate through the belt 44. The grinding wheel 36 is also rotated, and so is the pulse generator 40 to produce a number of pulses per one rotation of the grinding wheel 36.

Assuming that the number of pulses generated by the pulse generator 40 per one rotation, or the division number of the pulse generator 40 is PG 1, a division error $\Delta 1$ due to the rotation of the pulse generator 40 is calculated as follows:

$$\Delta 1 \approx \pi M N / PG\ 1 \qquad (1)$$

where
M: the module of the grinding wheel, and
n: the teeth of the grinding wheel.
If M=2.5, n=1, and PG 1=21,600, then the division error $\Delta 1$ becomes:

$$\Delta 1 = 3.24 \times 2.5 \times 1/21,600 \approx 0.000363 \qquad (2)$$

The frequency-divided pulses to go high normally are normally displaced with respect to one of the pulses from the pulse generator 40, and a displacement $\Delta WO$ from that pulse is given by:

$$\Delta WO \leq \Delta \tfrac{1}{2} \qquad (3)$$

By substituting the result of the equation (2) for the division error in the formula (3), $$\Delta WO \leq 0.000363/2 \approx 0.2\mu \qquad (4)$$

The ratio of the number of pulses for driving the stepping motor 22 to the number of pulses generated by the pulses generator 40, that is, the pulse selection ratio B/A is calculated as follows:

$$B/A = PG\ 2/PG\ 1 \times n/ZW \times r12 \qquad (5)$$

where
PG 1: the division number of the pulse generator,
PG 2: the division number of the stepping motor,
ZW: the number of teeth of the gear,
n: the number of teeth of the grinding wheel, and
r12: Z1/Z2 (reduction gear ratio).
Assuming that PG 1=21,600, PG 2=1,000, ZW=60, n=1, r12=515/17, the pulse selection ratio B/A is given by:

$$\begin{aligned} B/A &= 1{,}000 \times 1 \times 515/(21{,}600 \times 60 \times 17) \\ &= 515/22032 \approx 0.023 \end{aligned} \qquad (6)$$

Therefore, 515 pulses are selected equally from the 22,032 of PG 1 to drive the stepping motor 22. An error $\Delta W1$ of an interval of pulses for substantially driving the stepping motor 22 is expressed by:

$$\Delta W1 \approx B/A \qquad (7)$$

Accordingly, from the the value of the equation (6) results the following:

$$\Delta W1 \approx 0.023 \qquad (8)$$

In practice, the accuracy required of the workpiece gear may be in the range of 1 μm, and the ratio of the difference between adjacent pulse intervals of the input pulse train applied to the stepping motor 22 to a pulse interval is smaller than the order of 1/10, so that the stepping motor can follow the pulses sufficiently. The numerical values obtained by the equations (4) and (8):

$$\Delta W0 \, max \approx 0.2\mu < 1\mu$$

$$\Delta W1 \approx 0.023 < 1/10$$

fall within an allowable error range or a range which can substantially be employed.

With the foregoing condition used as a premise, the pulse selection ratio is selected here to be $0.023 \approx 1/42.8$. For example, the grinding wheel 36 and the gear 20 can be rotated in synchronism within an allowable error range by extracting 515 pulses substantially equally from 22,032 pulses generated by the pulse generator 40 through frequency division and energizing the stepping motor 22 with the extracted pulses. The pulse selection ratio is about 1/42.8, and if the stepping motor 22 is rotated with a number of output pulses which are determined as 42 or 43, then division errors are accumulated, and the stepping motor 22 cannot be rotated accurately. The apparatus of the present invention is particularly effective in correcting the division error.

More specifically, a train of pulses supplied from the pulse generator 40 is applied to the counter 48 which subtracts 42 or 43 pulses from the pulse train successively to issue frequency-divided pulses to the amplifier 56.

The CPU 52 has been fed with the information PG 1, PG 2, n, ZW, r12 and the like through the input unit 54, and processes these pieces of information and stores them as division error correcting data in the data memory 54. If, for example, 22,032 pulses are generated in one cycle by the pulse generator 40, these pulses are sequentially applied to the counter 48. The CPU 52 reads the division error correcting data out of the data memory 54 and supplies the data through the output port 62 to the adder 50. The data memory 54 sequentially stores the division error correcting data 0, 1, 1, 0, 1 as shown in FIG. 3, which are read by the CPU 52. The adder 50 is supplied with a set signal such that the adder 50 will produce 42 output pulses at all times. When the output signal from the CPU 52 is applied and added, the adder 50 supplies the counter 48 successively with a set signal in the order 42, 43, 43, 42, 43 dependent on the order of the data 0, 1, 1, 0, 1. Responsive to the applied set signal, the counter 48 successively applies a 42nd pulse, a 43rd pulse, a 43rd pulse, a 42nd pulse, and a 43rd pulse out of the 22,032 pulses to the amplifier 56 as shown in FIG. 4. Immediately after these pulses have been issued, a next set signal is applied to the counter 48 to ready the latter for counting further pulses.

More specifically, with a "0" signal issued from the CPU 52, the counter 48 generates one pulse to the amplifier 56 to energize the stepping motor 22 when 42 pulses are supplied thereto. Where a "1" signal is issued from the CPU 52, the counter 48 produces a pulse for driving the stepping motor 22 only when 43 pulses are supplied to the counter 48. The above operation is repeated until the division number 515 of the stepping motor 22 is cycled, whereupon the first data starts to be read out again. When the stepping motor 22 is energized, the gear 66 is rotated through the gear 64 to cause the clutch 62 to rotate the workpiece gear 20 which is then displaced dependent on the output drive pulses. The workpiece gear 20 is thus rotated in synchronism with the grinding wheel 36 through pulse division.

With the present invention, as described above, a rotary tool and a workpiece can by brought into synchronous operation based on pulse division through a highly simple arrangement, which has heretofore been difficult to achieve mechanically. Since the basic data stored in the data table are repeatedly used, any unwanted accumulation of division errors is prevented so that the workpiece can be ground to a nicety.

While the invention has been particularly shown and described with respect to a preferred embodiment thereof, it will be understood by those in the art that various changes in form and detail may be made therein without departing from the spirit and scope of the present invention.

What is claimed is:

1. A synchronous operation control apparatus for operating a rotating tool and a rotating workpiece in synchronism, comprising:
   (a) a pulse generator for generating pulses at a first frequency dependent on the speed of rotation of the tool;
   (b) a workpiece motor operatively coupled to a rotating shaft of the workpiece for rotating the workpiece;
   (c) an adjustable frequency divider connected to said pulse generator to produce drive pulses at an adjustable second frequency;
   (d) means for energizing said workpiece motor at a speed represented by the second frequency; and
   (e) a memory connected to said frequency divider and storing data to correct an error produced when said frequency divider frequency-divides the pulses generated by said pulse generator, the arrangement being such that the second frequency is adjusted on the basis of the stored data to produce a prescribed number of pulses to energize said workpiece motor.

2. A synchronous operation control apparatus according to claim 1, wherein said frequency counter comprises a subtracting counter.

3. A synchronous operation control apparatus according to claim 1, including an adder connected to an output terminal of said memory for determining a frequency division frequency of said frequency divider from an output data signal from said memory for correcting the error and for issuing said frequency division frequency as a setting signal to said frequency divider.

4. A synchronous operation control apparatus according to claim 1, wherein said tool comprises a grinding wheel, and said workpiece comprises a gear to be ground by said grinding wheel in mesh therewith.

* * * * *